Patented July 23, 1946

2,404,691

UNITED STATES PATENT OFFICE 2,404,691

CHEMICAL COMPOUNDS

Walter G. Christiansen, Glen Ridge, and Sidney E. Harris, Nutley, N. J., assignors to E. R. Squibb & Sons, New York, N. Y., a corporation of New York No Drawing. Continuation of application Serial No. 163,034, September 9, 1937. This application August 30, 1944, Serial No. 552,013

6 Claims. (Cl. 260—473)

This application is a continuation of Christiansen and Harris application Serial No. 163,034, filed September 9, 1937.

This invention relates to, and has for its object the provision of, certain amino-alcohol esters of oxy-benzoic acids, acid-addition salts thereof, and methods of preparing them. The esters of this invention are comprehended by the general formula

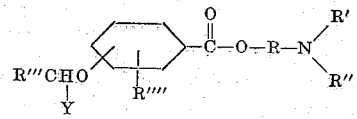

wherein R represents a divalent aliphatic, cycloaliphatic, or aromatic radical providing a continuous carbon bridge, R' and R'' represent alkyl, aralkyl, hydroxy-alkyl, or hydroxy-aralkyl, or jointly represent an alkylene group, R''' represents an aliphatic, aromatic, or araliphatic radical, R'''' represents hydrogen, alkyl, or an alkoxy radical, and Y represents hydrogen or alkyl.

The compounds of this invention are valuable therapeutic agents, being particularly effective for inducing local anethesia.

In the practice of this invention, an aracyl halide comprehended by the general formula

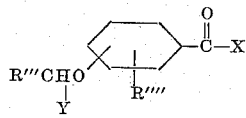

wherein X is a halogen, and Y, R''', and R'''' have the above-noted signification, is reacted with an alcohol comprehended by the general formula

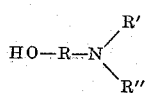

wherein R, R', and R'' have the above-designated meaning, to produce the desired ester. However, other methods hereinafter described may be employed to produce the compounds of the present invention.

The amino-esters of this invention are generally recovered in the form of their addition-salts with hydrochloric acid. However, other acids forming addition-salts with amines may be used in place of hydrochloric; such acids are boric, nitric, lactic, tartaric, citric, phosphoric, sulfuric, picric, and picrolonic. The addition-salts may be converted into the free bases in the usual manner.

The following examples are illustrative of the invention.

EXAMPLE 1

β-diethylamino-ethyl ester of p-ethoxy-benzoic acid 10 g. of p-ethoxy-benzoyl chloride dissolved in 50 cc. of dry benzene is treated with 6.8 g. of β-diethylamino-ethanol; a precipitate forms, and the reaction is completed by heating on the water bath. After cooling the solution, filtering off the precipitate, and treating it with a slight excess of 2N potassium hydroxide solution, the ester is extracted with ether and dried with anhydrous sodium sulfate. On passing dry hydrogen chloride through the ether solution, a crystalline precipitate of the hydrochloride of the ester forms; it is filtered off, washed with dry ether, and then melts at 172.5–173.5° C. (corrected).

EXAMPLE 2

β-[N-ethyl-N-(n-amyl)-amino]-ethyl ester of p-ethoxy-benzoic acid 4.1 g. of p-ethoxy-benzoyl chloride dissolved in 15 cc. of dry benzene is refluxed for 30 minutes with a solution comprising 3.5 g. of β-[N-ethyl-N-(n-amyl)-amino]-ethanol in 10 cc. of dry benzene; distilling off the benzene in vacuo, dissolving the residue (crude hydrochloride of the desired ester) in alcohol, decolorizing with carbon, and reprecipitating with dry ether, followed by recrystallization from an acetone-(petroleum ether) mixture, yields the hydrochloride of the desired product, having a melting point of 108–110° C. (corrected).

EXAMPLE 3

β-[di-(n-butyl)-amino]-ethyl ester of p-ethoxy-benzoic acid 4.6 g. of p-ethoxy-benzoyl chloride dissolved in 12 cc. of dry benzene is admixed with a solution comprising 4.35 g. of β-[di-(n-butyl)-amino]-ethanol in 5 cc. of dry benzene, the reaction proceeding to completion at room temperature; the benzene is distilled off under reduced pressure; then recrystallizing the crude hydrochloride of the desired ester from an acetone-(petroleum ether) mixture yields a product having a melting point of 144.5–145.5° C. (corrected).

EXAMPLE 4

Gamma-[di-(n-butyl)-amino]-propyl ester of p-ethoxy-benzoic acid

A solution comprising 4.6 g. of p-ethoxy-benzoyl chloride in 12 cc. of dry benzene is added to 4.7 g.

of gamma-[di-(n-butyl)-amino]-propanol dissolved in 5 cc. of dry benzene; after the reaction is complete, the benzene is distilled off in vacuo; and recrystallizing the hydrochloride of the crude ester from an acetone-ether mixture, one obtains a product melting at about 85.6–86.6° C. (corrected).

Example 5

β-diethylamino-ethyl ester of p-n-butoxy-benzoic acid

A solution of 10.5 g. of p-n-butoxybenzoyl chloride in 25 cc. of dry benzene is refluxed for two hours with a solution comprising 6.14 g. of β-diethylamino-ethanol in 10 cc. of dry benzene; the solution is allowed to cool, and the hydrochloride of the desired ester separates as a heavy crystalline deposit; after filtering and washing the precipitate with benzene and dry ether, a compound having a melting point of 146° C. (corrected) is obtained.

Example 6

β-dimethylamino-ethyl ester of p-n-butoxy-benzoic acid 4.5 g. of β-dimethylamino-ethanol dissolved in 10 cc. of dry benzene is treated with a solution comprising 10.5 g. of p-n-butoxy-benzoyl chloride in 20 cc. of dry benzene; filtering off the precipitate and washing it with benzene and petroleum ether yields the hydrochloride of the desired ester, having a melting point of 132–133° C.

Example 7

β-diethylamino-ethyl ester of 2-ethoxy-3-methyl-benzoic acid 11.5 g. of 2-ethoxy-3-methyl-benzoyl chloride dissolved in 50 cc. of dry benzene is treated with a solution comprising 13 g. of β-diethylamino-ethanol in 25 cc. of dry benzene; as the reaction proceeds, a crystalline deposit separates out; filtering and washing the precipitate, evaporating the filtrate and washings to dryness, redissolving the residue in alcoholic hydrochloric acid, followed by reprecipitation therefrom with dry ether, yields the desired product, having a melting point of 97–97.5° C.

The 2-ethoxy-3-methyl-benzoyl chloride may be prepared by treating 3.5 g. of sodium dissolved in 100 cc. of absolute alcohol with 25 g. of ethyl o-cresotinate, after which 20 g. of ethyl bromide is added and the solution is boiled until neutral to moist litmus; then after filtering, and distilling the alcohol from the filtrate, the ethyl ether of ethyl o-cresotinate, having a boiling point of 116–118° C./6 mm., is fractionated in vacuo from the residue; dissolving 21 g. of this fraction in alcoholic sodium hydroxide, cooling, and acidifying the solution with hydrochloric acid, yields 2-ethoxy-3-methyl-benzoic acid as an oily precipitate, which may be extracted with ether and subsequently dried; this extract, after distilling off the ether, is boiled for two hours with 20 g. of thionyl chloride, whereupon fractional distillation yields the desired intermediate, 2-ethoxy-3-methyl-benzoyl chloride, which passes over at 102–105° C./2.5 mm.

Example 8

β-diethylamino-ethyl ester of o-ethoxy-benzoic acid 10 g. of o-ethoxy-benzoyl chloride dissolved in 50 cc. of dry benzene is treated with a solution comprising 6.5 g. of β-diethylamino-ethyl alcohol in benzene, the hydrochloride of the ester separating out; then filtering, and purifying the filter cake by reprecipitation from its alcoholic solution with dry ether, yields a product having a melting point of 139–139.5° C. (corrected).

Example 9

β-diethylamino-ethyl ester of p-(β-diethylamino-ethoxy)-benzoic acid 5 g. of p-diethylaminoethoxy-benzoyl chloride hydrochloride suspended in a solution comprising 2 g. of β-diethylamino-ethanol in 20 cc. of dry benzene is refluxed for several hours; the precipitate (mono-hydrochloride of the ester), after filtration and purification by reprecipitating the filter cake from a mixture of alcohol and ether, yields the desired product as a very hygroscopic substance.

The p-(β-diethylamino-ethoxy)-benzoic chloride may be prepared as follows: 13 g. methyl ester of p-hydroxy benzoic acid is dissolved in 35 cc. acetone, and 15 g. anhydrous potassium carbonate is suspended therein. The mixture is refluxed and stirred, and 13 g. β-diethylamino-ethyl chloride is added, the reaction mixture being heated and stirred for 15 hours. The inorganic salts precipitated are filtered off, and the filtrate concentrated by distillation; the residue is treated with an excess of aqueous sodium hydroxide, and boiled until saponification is complete. Any alkali-insoluble material is removed by extracting with a solvent such as ether or benzene; the clear alkaline solution is acidified with HCl, evaporated to dryness in vacuo, and the residue extracted with absolute alcohol. The extract is filtered, evaporated to dryness, and the residue recrystallized from methyl alcohol and ether. The hydrochloride of p-(β-diethylamino-ethoxy)-benzoic acid obtained is in the form of white needles, melting at 160–161° C. (corrected).

19.5 g. p-(β-diethylamino-ethoxy)-benzoic acid and 15 g. phosphorus pentachloride are heated together on the steam bath until reaction ceases. The POCl₃ which forms is distilled off in vacuo, and the residue is allowed to crystallize; crystallization may be hastened by triturating with acetone and filtering.

The hydrochloride of p-(β-diethylamino-ethoxy)-benzoyl chloride formed melts at 143° C. (corrected).

Example 10

β-diethylamino-ethyl ester of 2-methyl-4-ethoxy-benzoic acid 7.5 g. of 2-methyl-4-ethoxy-benzoic acid is warmed with 8.6 g. of phosphorus pentachloride until the reaction ceases; fractional distillation of the reactants under reduced pressure yields 2-methyl-4-ethoxy-benzoyl chloride as a colorless liquid boiling at 138–140° C./3 mm. A solution of 6 g. of this fraction in 20 cc. of dry benzene is treated with 7.6 g. of β-diethyl-amino-ethanol dissolved in 10 cc. of dry benzene, and crystals of diethylamino-ethanol hydrochloride separate out; filtering off the precipitate, treating the filtrate with alcoholic hydrochloric acid, and diluting it with dry ether, yields the hydrochloride of the desired ester as a white crystalline solid melting at 101–103° C.

Example 11

β-diethylamino-ethyl ester of 3-methyl-4-ethoxy-benzoic acid 13 g. of 3-methyl-4-ethoxy-benzoic acid and 15 g. of phosphorus pentachloride are heated on a steam bath for 30 minutes, and then fractionally distilled in vacuo, the fraction 3-methyl-4-ethoxy-benzoyl chloride being obtained as a colorless liquid boiling at 147–152° C./6 mm. A solution comprising 6.5 g. of this fraction dissolved in 16 cc. of dry benzene, is mixed with 7.5 g. of diethylamino-ethanol dissolved in 18 cc. of dry benzene, and the mixture boiled for 60 minutes; cooling the reaction mixture causes a white crystalline precipitate of β-diethylamino-ethanol hydrochloride to separate out completely; then filtering, treating the filtrate with alcoholic hydrochloric acid, and distilling off the benzene and alcohol, leaves a white solid residue which upon recrystallization from a mixture of absolute alcohol and dry ether, yields the hydrochloride of the desired product as a white crystalline precipitate having a melting point of 142.5–145° C.

Example 12

*Gamma-diethylamino-propyl ester of p-ethoxy-benzoic acid*

5.5 g. of gamma-diethylamino-propanol, 9.3 g. of p-ethoxy-benzoyl chloride, and 25 cc. of sodium hydroxide (10% solution) are vigorously stirred for 30 minutes; the mixture is cooled, the oily layer extracted with benzene, and the resultant solution is washed with dilute sodium hydroxide and water; distilling off the benzene, dissolving the residual oil in absolute alcoholic hydrochloric acid solution, and diluting the latter with ether, causes the hydrochloride of the desired ester to separate out as a crystalline precipitate, which, after filtering and recrystallizing from an alcohol-ether mixture, yields the desired product, having a melting point of 148.5–149.5° C.

Example 13

*2-(diethylamino)-cyclohexyl ester of p-ethoxy-benzoic acid*

A solution comprising 6.8 g. of 2-diethylamino-cyclohexanol-1 dissolved in 75 cc. of dry benzene is treated with 10 g. of finely powdered anhydrous potassium carbonate suspended therein; 7.3 g. of p-ethoxy-benzoyl chloride is added to the mixture and the latter is refluxed, with stirring, for several hours, whereupon 100 cc. of water and 100 cc. of benzene are added thereto and the diluted solution is shaken vigorously; and the benzene layer containing the desired ester separates out. Decanting off the benzene solution, washing it with dilute sodium hydroxide and water, distilling off the benzene, and adding an alcoholic solution of hydrochloric acid to the residue, followed by dilution with dry ether, yields the crude hydrochloride of the desired ester as an oily precipitate which rapidly crystallizes; filtering and purifying the filter cake by recrystallizing from an alcohol-ether mixture, yields the desired product, melting at 184–185° C.

Example 14

*β-hydroxy-gamma-diethylamino-propyl ester of p-ethoxy-benzoic acid*

A solution of 5 g. of 1-diethylamino-2,3-propanediol dissolved in 50 cc. of benzene wherein 8 g. of potassium carbonate is previously suspended, is treated with 5.4 g. of p-ethoxy-benzoyl chloride, and the mixture is refluxed, with stirring, for 90 minutes. On cooling overnight, the precipitate formed is filtered off, and alcoholic hydrochloric acid is added to the filtrate, the resultant solution being evaporated to dryness. Recrystallizing the residue from alcohol and dry ether, yields the desired product, which is a mixture of two isomers, and has a melting-point range of 120–126° C.

Example 15

*β-[N-ethyl-N-(β-hydroxyethyl)-amino]-ethyl ester of p-ethoxy-benzoic acid*

6.7 g. of β,β'-dihydroxy-triethylamine is dissolved in 100 cc. of dry benzene; 14 g. of potassium carbonate is suspended therein, and after adding 9.2 g. of p-ethoxy-benzoyl chloride, the reactants are refluxed, with stirring, for two hours. Filtering the reactants, evaporating the benzene, and distilling the residue in vacuo yields the desired product as a thick, colorless oil, soluble in dilute acids, and having a boiling point of 218–225° C./8 mm. Its hydrochloride is very hygroscopic.

Example 16

*α,α-di-(N-dimethylaminomethyl)-n-propyl ester of p-ethoxy benzoic acid*

1.5 g. of 1,3-di-dimethylamino-2-ethyl-propanol-2 and 1.6 g. of p-ethoxy-benzoic acid are each dissolved in 5 cc. of chloroform, and the mixture of the solutions is heated on a steam bath for 5 minutes. Adding dry ether, filtering the precipitate formed, washing, and drying the filter cake, yields the hydrochloride of the desired product as a white crystalline powder having a melting point of 121–121.5° C.

Example 17

*β-diethylamino-isohexyl ester of p-ethoxy-benzoic acid*

5.7 g. of β-diethylamino-isohexanol, 6.1 g. of p-ethoxy-benzoyl chloride, 10 g. of potassium carbonate, and 50 cc. of dry benzene are reacted in the manner described in Example 15. The ester formed boils at 175–185° C./2.5 mm. and 193–195° C./5 mm.

Example 18

*Gamma-diethylamino-(β-hydroxy)-propyl ester of p-n-butoxy benzoic acid*

A solution of 5 g. of 1-diethylamino-2,3-propanediol, 6.2 g. of p-n-butoxy-benzoyl chloride, and 10 g. of potassium carbonate, in 50 cc. of benzene, is refluxed for 90 minutes and treated in accordance with Example 14. The desired product, being a mixture of two isomers, has no sharp melting point (79–96° C.).

Example 19

*β-[N-ethyl-N-(β-hydroxyethyl)-amino]-ethyl ester of p-n-butoxy-benzoic acid*

This compound is obtained in the same manner as that of Example 15, except that p-n-butoxy-benzoyl chloride is used instead of the p-ethoxy-benzoyl chloride, and the amount of the ethyl diethanolamine used is 7 g. The desired product has a boiling point of 216–220° C./3 mm. Its hydrochloride is hygroscopic.

Example 20

*α,α-di-(N-dimethylaminomethyl)-n-propyl ester of p-n-butoxy-benzoic acid*

This compound is prepared in the same manner as that of Example 16, except that p-n-butoxy-benzoic acid is used instead of the p-ethoxy benzoic acid. The desired substance has a melting point of 111° C.

Example 21

β-diethylaminoethyl ester of m-ethoxy-benzoic acid 11.5 g. of m-ethoxy-benzoyl chloride dissolved in 50 cc. of dry benzene is mixed with 14.5 g. of diethylamino-ethanol dissolved in 50 cc. of benzene, and the mixture is heated on a steam bath for 60 minutes, whereupon the precipitate formed (diethylamino-ethanol hydrochloride) is filtered off and the benzene is distilled from the filtrate, yielding a residue which after purification by vacuum distillation has a boiling point of 163–175° C./2 mm. Dissolving this product in alcoholic hydrochloric acid and reprecipitating with ether, yields the hydrochloride of the ester melting at 125–125.5° C.

Example 22

β-diethylamino-ethyl ester of p-(β-ethoxy-ethoxy)-benzoic acid 15 g. of methyl p-hydroxy-benzoate and 18 g. of β-bromo-ethyl ether dissolved in 50 cc. of dry acetone, are treated with a suspension therein of 20 g. of powdered anhydrous potassium carbonate, and the mixture is then refluxed, with stirring, for 15 hours. The potassium carbonate and potassium bromide precipitated are filtered off, the acetone is distilled from the filtrate, and the residue boiled with dilute sodium hydroxide solution until dissolved; p-(β-ethoxyethoxy)-benzoic acid is precipitated with hydrogen chloride, and after filtering, washing, drying the precipitate, and recrystallizing from benzene, yields a product melting at 131–132° C. Heating a mixture comprising 6 g. of this benzoic acid derivative and 6 g. of phosphorus pentachloride to about 70° C. until hydrogen chloride is no longer evolved, and fractionally distilling in vacuo, yields p-(β-ethoxyethoxy)-benzoyl chloride as a colorless oil having a boiling point of 150–160° C./5 mm. Refluxing a mixture comprising 5 g. of this benzoyl chloride derivative, 5.1 g. of diethylamino-ethanol, and 50 cc. of dry benzene, for 30 minutes, filtering off the precipitate (diethylamino - ethanol hydrochloride), evaporating off the benzene and alcohol, treating the residue with ether, and adding alcoholic hydrogen chloride, yields the desired ester as a white crystalline hydrochloride melting at 102–103.5° C.

Example 23

β-diethylamino-ethyl ester of p-n-propoxy-benzoic acid

After mixing and refluxing solutions comprising 9.5 g. of p-n-propoxy-benzoyl chloride and 11.2 g. of diethylamino-ethanol, each dissolved in 25 cc. of benzene, for 30 minutes, the reaction mixture is cooled, and 100 cc. of dilute sodium hydroxide solution is added; then after vigorously shaking the mixture, the benzene layer, containing the desired ester, separates and is decanted off. Then washing the benzene solution with water, distilling off the benzene, and vacuum-distilling the residue, yields the desired ester, having a boiling point of 160–165° C./4 mm.

The hydrochloride is obtained, in accordance with Example 21, in the form of a white crystalline solid, melting at 135–136° C.

Example 24

β-diethylamino-ethyl ester of p-isopropoxy-benzoic acid

Solutions comprising 6.5 g. of p-isopropoxy-benzoyl chloride and 7.7 g. of diethylamino-ethanol, each in 25 cc. of dry benzene, are mixed and warmed on a steam bath for 60 minutes. Filtering off the precipitated diethylamino-ethanol hydrochloride, and evaporating the benzene from the residue, the latter is treated with ether and alcoholic hydrochloric acid to yield the desired ester as the hydrochloride in the form of a white crystalline solid melting at 125.5° C.

Example 25

β-diethylamino-ethyl ester of p-allyloxy-benzoic acid

This compound is prepared in the same manner as that of Example 24, except that 8 g. of p-alloxy-benzoyl chloride (instead of the p-n-propoxy derivative) and 9.5 g. of diethyl-aminoethanol are used. The boiling point of the ester is 165–175° C./4 mm. The hydrochloride melts at 130° C.

Example 26

β-diethylamino-ethyl ester of p-(β-phenyl-ethoxy)-benzoic acid

The aracyl halide for the preparation of this compound is obtained as follows: To 15.2 g. of methyl p-hydroxy-benzoate dissolved in a solution of 2.5 g. of metallic sodium in 90 cc. of absolute alcohol, is added 20.5 g. of β-phenyl-ethyl bromide, and the mixture is refluxed 7 hours. Filtering off the inorganic salts, distilling off the alcohol from the filtrate, hydrolyzing the residue by boiling it with aqueous alkali, precipitating the free acid with hydrogen chloride, filtering, washing, and drying, yields the intermediate, p-(β-phenyl-ethoxy)-benzoic acid, in the form of a white powder, melting at 163–164° C. Dissolving 10 g. of this intermediate compound in 40 cc. of phosphorus oxychloride, adding 8.6 g. of phosphorus pentachloride, warming the mixture on a steam bath, evaporating off the excess phosphorus oxychloride, adding 8.6 g. of phosphorus pentachloride, warming the mixture on a steam bath, evaporating off the excess phosphorus oxychloride, and vacuum-distilling the residue, yields the acid chloride of the intermediate, having a boiling point (with slight decomposition) of 215–230° C./5 mm.

Example 27

β-diethylamino-ethyl ester of p-(β-bromallyloxy)-benzoic acid

A solution comprising 17 g. methyl p-hydroxy-benzoate and 25 g. 2,3-dibromopropene and a suspension of 20 g. potassium carbonate in 50 cc. of acetone, is refluxed, with stirring, for 10 hours; filtering the mixture, evaporating the acetone from the filtrate, hydrolyzing the residue by heating with aqueous sodium hydroxide, precipitating the free acid with hydrogen chloride, and after filtering, washing, and drying the precipitate, recrystallizing it from benzene, yields the desired intermediate, p-(β-bromallyloxy)-benzoic acid, melting at 200° C. (with decomposition). Warming 9.5 g. of this benzoic acid derivative with 7.7 g. of phosphorus pentachloride, and fractionating the mixture in vacuo, yields the desired acid chloride intermediate, boiling at 160–170° C./5 mm.

Refluxing a mixture comprising 6 g. of this p-(β-bromalloxy)-benzoyl chloride and 5.1 g. of diethylamino-ethanol, each dissolved in 25 cc. of dry benzene, for half an hour, filtering off the precipitate and treating the filtrate with alcoholic hydrochloric acid, yields, after evaporating the benzene and hydrogen chloride and recrystallizing the residue from alcohol and ether, the desired compound, melting at 81.5–83.5° C.

EXAMPLE 28

*β-diethylamino-ethyl ester of 3-methoxy-4-ethoxy-benzoic acid*

9.3 g. of 3-methoxy-4-ethoxy-benzoic acid reacted with 10.5 g. of phosphorus pentachloride, yields the acid chloride, boiling at 147–150° C./5 mm. and having a melting point of 72° C. Treating 9 g. of this 3-methoxy-4-ethoxy-benzoyl chloride and 9.8 g. of diethylamino-ethanol in accordance with Example 27, yields the desired compound as a white crystalline powder having a melting point of 171.5–172.5° C.

EXAMPLE 29

*Delta-diethylamino-delta$^2$-butenyl ester of p-ethoxy-benzoic acid*

2.5 g. of p-ethoxy-benzoate of brombutenol is mixed with 5.5 g. of diethylamine and 15 cc. of benzene; the mixture is heated in a sealed tube at 125–135° C. for about 8 hours; after cooling, the contents of the tube is treated with water; the water-insoluble product is then separated or extracted with ether; the ether extract, after washing with water, is dried over anhydrous sodium sulphate; the ether, free diethylamine, and benzene are removed by distillation of the extract; the oily residue is subjected to further heating on a steam bath under diminished pressure, thereby removing the solvent by distillation; the product is dissolved in a small amount of alcoholic hydrochloric acid, and precipitated as an oily hydrochloride by the addition of ether; the supernatant alcohol-ether mixture is decanted off, leaving an oily residue which, after extraction with dry ether, yields the desired product as a yellowish white crystalline substance melting at 146–147° C.

The intermediate p-ethoxy-benzoate of brombutenol may be prepared as follows: 5.5 g. of dry sodium p-ethoxy benzoate is mixed with 8 g. of α-gamma-dibrombutene and 10 g. of dry xylene; the mixture is heated in a sealed tube at 165–170° C. for about 6 hours, the contents of the tube is then extracted with dilute alcohol and ether; the ether extract, after washing with water, is dried over anhydrous sodium sulphate; the ether and xylene are removed by distillation of the extract on a steam bath under diminished pressure; the oily residue is fractionated in a high vacuum; the first fraction coming over at 95–97° C./3–4 mm.; the second at 165–175° C./3 mm.; the third at 200° C./3 mm.; the second fraction being the desired intermediate, p-ethoxy-benzoate of brombutenol.

EXAMPLE 30

*β-[N - ethyl - N - (β - phenyl-β-hydroxy-ethyl)]-amino-ethyl ester of p-ethoxy-benzoic acid*

A mixture comprising 9.95 g. of phenacyl bromide, 4.4 g. ethylaminoethanol, and 100 cc. benzene is refluxed for three hours. On adding 10 g. of potassium carbonate, a vigorous evolution of carbon dioxide ensues. The suspension is then further refluxed for four hours, the mixture of potassium bromide and potassium carbonate filtered off, and the filtrate treated with a solution of hydrogen chloride in ether. The reddish-brown semi-solid which separates out crystallizes, and is filtered off, washed with ether, and dried in a vacuum over calcium chloride. The extremely hygroscopic substance formed is N-phenacy-N-ethyl-amino-ethanol hydrochloride.

A mixture comprising 7.28 g. of N-phenacyl-N-ethyl-amino-ethanol, 7.5 g. p-ethoxy-benzoyl chloride, 30 cc. benzene, and 8 g. potassium carbonate is stirred and refluxed for five hours, filtered, and the filtrate is treated with a solution of hydrogen chloride in ether. The impure material is then purified by crystallization from a chloroform - (petroleum ether) mixture. The white crystalline substance obtained is the N-phenacyl-N-ethylamino ethyl ester of p-ethoxy-benzoic acid (hydrochloride).

0.9 g. of this hydrochloride is dissolved in 60 cc. alcohol containing 0.3 g. platinum oxide. The mixture is shaken for eight hours under a pressure of 35 pounds of hydrogen; it is then filtered, and the filtrate is concentrated to a small volume and diluted with ether. The brownish-white crystalline substance is filtered off, washed with ether, and dried in a vacuum over calcium chloride. The substance is β-[N-ethyl-N-(β-phenyl-β-hydroxy-ethyl)]-amino-ethyl ester of p-ethoxy-benzoic acid (hydrochloride).

EXAMPLE 31

*β,β'-di(dimethylamino)-isopropyl ester of p-n-propoxy-benzoic acid (hydrochloride)*

2 g. β,β'-di-(dimethylamino)-isopropanol and 3.2 g. p-n-propoxy benzoyl chloride are each dissolved in 5 cc. chloroform, and the solutions are mixed. A precipitate forms, which is dissolved by adding dry acetone, and the reaction is completed by warming for a short time on the water bath. The solvents are then distilled off, and the residue recrystallized from a mixture of alcohol and ether. The product, which melts at 203° C. with decomposition, is a mixture of the mono- and di-hydrochlorides.

EXAMPLE 32

*β-diethylamino-ethyl ester of p-(p'-amino-benzyloxy)-benzoic acid (mono-hydrochloride)*

5 g. β-diethylamino-ethyl ester of p-(p'-nitrobenzyloxy)-benzoic acid hydrochloride is dissolved in absolute alcohol and shaken with hydrogen gas in the presence of Adams platinum oxide catalyst (Org. Syn., Col. Vol. page 452), until no more hydrogen is absorbed. The catalyst is then removed by filtration, and dry ether is added to precipitate the hydrochloride; on recrystallizing by dissolving in absolute alcohol and adding dry ether, a product melting at 185–187° C. (corrected) is obtained.

EXAMPLE 33

*β,β-dimethyl-gamma-diethylamino-propyl ester of p-ethoxy benzoic acid (hydrochloride)*

4.1 g. β,β-dimethyl-gamma-diethylamino-propanol is dissolved in 4 cc. dry acetone, and a solution of 4.7 g. p-ethoxy benzoyl chloride in 5 cc. dry acetone is added thereto. Heat is evolved and a white crystalline mass forms. The crude product is dissolved in absolute alcohol and precipitated by adding dry ether. The hydrochloride is thus obtained as a white crystalline solid melting at 122–124° C. (corrected).

EXAMPLE 34

*Gamma-dimethylamino-propyl ester of 3-methyl-4-n-butoxy-benzoic acid*

1.53 g. gamma-dimethylamino-propanol and 3.17 g. 3-methyl-4-n-butoxy-benzoyl chloride are dissolved in 10 cc. of dry alcohol-free chloroform.

The solution is warmed on a steam bath for half an hour and the product precipitated as the hydrochloride by adding dry ether; it may be purified by redissolving in chloroform or absolute alcohol and reprecipitating. The product is a white crystalline powder melting at 125.5–126.5° C. (corrected).

Example 35

α,α-di(dimethylaminomethyl)-gamma-phenyl-n-propyl ester of 3-methyl-4-n-butoxy-benzoic acid (hydrochloride)

36 g. of the ethyl ester of 3-methyl-4-hydroxy-benzoic acid and 27.4 g. of n-butyl bromide dissolved in 200 cc. acetone, are treated with 84 g. anhydrous potassium carbonate in the manner described in Example 22. The product, 3-methyl-4-n-butoxy-benzoic acid, is recrystallized from 60% alcohol in the form of white plates melting at 144–146° C. (corrected).

15 g. of this acid is reacted with 15 g. phosphorus pentachloride in the manner described in Example 22. The product, 3-methyl-4-n-butoxy-benzoyl chloride, boils at 144–154° C. at 1.5 mm.

1.05 g. of 3-methyl-4-n-butoxy-benzoyl chloride and 1.25 g. of α,α-di(dimethylaminomethyl)-gamma-phenyl-propanol are dissolved in 10 cc. of chloroform and the solution is refluxed for a few minutes. Dry ether is added until a faint precipitate appears, and the whole is allowed to stand for some time. The crystalline precipitate formed is filtered off and washed with dry ether; it melts at 161–162° C. (corrected).

Example 36

Gamma-dimethylamino-n-propyl ester of p-(β-phenyl-ethoxy)-benzoic acid (hydrochloride)

1.55 g. gamma-dimethylamino-propanol and 4.0 g. p-(β-phenylethoxy)-benzoyl chloride are reacted in chloroform in the manner indicated in Example 35. The product melts at 156.5–157.5° C. (corrected).

Example 37

α-methyl-α-dimethylaminomethyl-n-amyl ester of 3-methyl-4-n-butoxy-benzoic acid (hydrochloride)

4.4 g. of 3-methyl-4-n-butoxy-benzoyl chloride and 3.0 g. of α-methyl-α-dimethylaminomethyl-n-amyl alcohol are reacted together in 10 cc. of chloroform as directed in Example 35. The product melts at 126–131° C. (corrected).

Example 38

β-diethylamino-ethyl ester of p-(p'-nitro-benzyl-oxy)-benzoic acid (hydrochloride)

5.5 g. p-nitro-benzyl bromide is added to a solution of 6.4 g. β-diethylamino-ethyl ester of p-hydroxy-benzoic acid in 50 cc. dry acetone in which 15 g. anhydrous potassium carbonate is suspended. The mixture is refluxed for 12 hours, filtered, and the acetone distilled from the filtrate. The residue is treated with a solution of hydrogen chloride in alcohol, some acetone is added, then ether; and the product precipitates as the hydrochloride. It is purified by recrystallization from acetone and ether, and melts at 145–146° C. (corrected).

The following are among the many other compounds embraced by the present invention, and may be prepared according to the directions given above:

39. α,α-di(dimethylaminomethyl)-amyl ester of p-(β-phenyl-ethoxy)-benzoic acid.

40. β-(N-piperidino)-ethyl ester of p-ethoxy-benzoic acid.

41. Delta-diamylamino-n-butyl ester of 2-propoxy-3-methyl-benzoic acid.

42. α-methyl-α-dimethylaminomethyl-gamma-phenyl-n-propyl ester of p-(β-phenyl-ethoxy)-benzoic acid.

43. α-methyl-α-dimethylaminomethyl-gamma-phenyl-n-propyl ester of 3-methyl-4-n-butoxy-benzoic acid.

44. Gamma-diethylamino-n-propyl ester of 3-ethyl-4-n-propoxy-benzoic acid.

45. Gamma-dimethylamino-n-propyl ester of 3-methyl-4-(β-phenyl-ethoxy)-benzoic acid.

46. α-methyl-α-dimethylaminomethyl-n-amyl ester of 3-methyl-4-(β-phenyl-ethoxy)-benzoic acid.

47. α-methyl-α-dimethylaminomethyl-gamma-phenyl-n-propyl ester of 3-methyl-4-(β-phenyl-ethoxy)-benzoic acid.

48. α-methyl-α-dimethylaminomethyl-n-amyl ester of p-(β-phenyl-ethoxy)-benzoic acid.

49. α,α-di(dimethylaminomethyl)-gamma-phenyl-n-propyl ester of 3-methyl-4-(β-phenyl-ethoxy)-benzoic acid.

50. α,α-di(dimethylaminomethyl)-n-amyl ester of 3-methyl-4-(β-phenyl-ethoxy)-benzoic acid.

51. α,α-di-dimethylaminomethyl-n-amyl ester of 3-methyl-4-n-butoxy-benzoic acid.

52. Delta-diethylamino-n-butyl ester of 3-methyl-4-n-butoxy-benzoic acid.

53. β-[N-ethyl-N(β-phenyl-ethyl)-amino]ethyl ester of p-ethoxy-benzoic acid.

54. α-methyl-β-benzyl-gamma-dimethylamino-propyl ester of p-ethoxy-benzoic acid.

55. α-benzyl-α-diethylaminomethyl-propyl ester of p-n-butoxy-benzoic acid.

56. α-methyl-α-diethylaminomethyl-n-butyl ester of p-n-propoxy-benzoic acid.

57. β-diethylamino-ethyl ester of 2-methyl-4-propoxy-benzoic acid.

58. β-dimethylamino-n-propyl ester of 3-methyl-4-propoxy-benzoic acid.

59. β-(β-diethylamino-ethoxy)-ethyl ester of p-ethoxy-benzoic acid.

Example 60

The intermediate 3-methyl-4-(β-phenyl-ethoxy)-benzoyl chloride used in the preparation of the compounds of Examples 45, 46, 47, 49, and 50 may be prepared as follows:

23 g. of the ethyl ester of 3-methyl-4-hydroxy-benzoic acid, 3.2 g. of sodium, and 23 g. of β-phenyl-ethyl bromide are reacted together in 200 cc. absolute alcohol in the manner described in Example 26. The product, 3-methyl-4(β-phenyl-ethoxy)-benzoic acid, melts at 150–152° C. (corrected).

13 g. of this acid, reacted with 10.5 g. phosphorus pentachloride in the manner described in Example 26, gives the corresponding acid chloride boiling at 210–215° C. at 1.0 mm.

The invention may be variously otherwise embodied, within the scope of the appended claims.

We claim:

1. A compound of the group consisting of: amino esters of the general formula

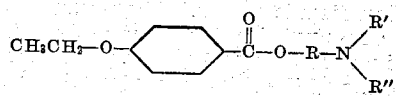

wherein R represents a divalent alkyl residue with 2 to 3 carbon atoms, and each of R' and R'' represents an alkyl residue with 2 to 4 carbon atoms; and acid-addition salts thereof.

2. An acid-addition salt of an amino ester of the general formula

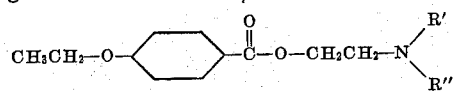

wherein each of R' and R" represents an alkyl residue with 2 to 4 carbon atoms.

3. β-diethylamino-ethyl ester of p-ethoxy-benzoic acid.

4. An acid-addition salt of β-diethylamino-ethyl p-ethoxy-benzoate.

5. The hydrochloride of β-diethylamino-ethyl p-ethoxy-benzoate.

6. The hydrochloride of β - [di - (n - butyl) - amino]-ethyl p-ethoxy-benzoate.

WALTER G. CHRISTIANSEN.
SIDNEY E. HARRIS.